(12) United States Patent
Moteki et al.

(10) Patent No.: US 6,208,654 B1
(45) Date of Patent: Mar. 27, 2001

(54) CELL MULTIPLEXING DEVICE FOR SYNCHRONOUS DIGITAL INTERFACE AND METHOD THEREOF

(75) Inventors: Umihiko Moteki; Toshiyuki Sato, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/047,156

(22) Filed: Mar. 24, 1998

(30) Foreign Application Priority Data

Sep. 11, 1997 (JP) .................................................. 9-245856

(51) Int. Cl.$^7$ ....................................................... H04J 3/24
(52) U.S. Cl. ........................ 370/395; 370/458; 370/468; 370/508
(58) Field of Search ................................... 370/384, 392, 370/395, 400, 419, 458, 466, 468, 508, 509

(56) References Cited

U.S. PATENT DOCUMENTS 3,564,144 * 2/1971 Diggelmann et al. ................ 370/468
5,619,499 * 4/1997 Nakabayashi ........................ 370/395
5,745,696 * 4/1998 Mendelson et al. .................. 370/468
6,021,128 * 2/2000 Hosoya et al. ....................... 370/392

* cited by examiner

Primary Examiner—Douglas Olms
Assistant Examiner—Shick Hom
(74) Attorney, Agent, or Firm—Helfgott & Karas, P.C.

(57) ABSTRACT

A line interface controlling unit terminates a synchronous digital interface. A bandwidth controlling unit generates a timing signal for specifying respective timings of a plurality of time slot groups (TS groups) in order to divide a plurality of time slots structuring the interface into the plurality of time slot groups. Division specification of the TS groups is made from a controlling device. A plurality of cell mapping controlling units identify each of the TS groups in the interface based on the timing signal, and map data streams of asynchronous fixed-length cells, which respectively belong to a plurality of communication device interfaces, onto each of the identified TS groups, for example, via a communication device interface controlling unit.

4 Claims, 12 Drawing Sheets

TIME SLOT STRUCTURE

BIT ASSIGNMENT

| FRAME NUMBER | F BIT | | | BIT ASSIGNMENT OF EACH TIME SLOT | | SIGNAL BIT ASSIGNMENT | | | |
|---|---|---|---|---|---|---|---|---|---|
| | BIT NUMBER | FPS | DL | CRC | DATA BIT | SIGNAL BIT | TRANS-PARENT MODE | 2-STATE SIGNAL | 4-STATE SIGNALS | 16-STATE SIGNALS |

| FRAME NUMBER | BIT NUMBER | FPS | DL | CRC | DATA BIT | SIGNAL BIT | TRANSPARENT MODE | 2-STATE SIGNAL | 4-STATE SIGNALS | 16-STATE SIGNALS |
|---|---|---|---|---|---|---|---|---|---|---|
| 1 | 0 | - | m | - | 1-8 | - | - | - | - | - |
| 2 | 193 | - | - | C1 | 1-8 | - | - | - | - | - |
| 3 | 386 | - | m | - | 1-8 | - | - | - | - | - |
| 4 | 579 | 0 | - | - | 1-8 | - | - | - | - | - |
| 5 | 772 | - | m | - | 1-8 | - | - | - | - | - |
| 6 | 965 | - | - | C2 | 1-7 | 8 | - | A | A | A |
| 7 | 1158 | - | m | - | 1-8 | - | - | - | - | - |
| 8 | 1351 | 0 | - | - | 1-8 | - | - | - | - | - |
| 9 | 1544 | - | m | - | 1-8 | - | - | - | - | - |
| 10 | 1737 | - | - | C3 | 1-8 | - | - | - | - | - |
| 11 | 1930 | - | m | - | 1-8 | - | - | - | - | - |
| 12 | 2123 | 1 | - | - | 1-7 | 8 | - | A | B | B |
| 13 | 2316 | - | m | - | 1-8 | - | - | - | - | - |
| 14 | 2509 | - | - | C4 | 1-8 | - | - | - | - | - |
| 15 | 2702 | - | m | - | 1-8 | - | - | - | - | - |
| 16 | 2895 | 0 | - | - | 1-8 | - | - | - | - | - |
| 17 | 3088 | - | m | - | 1-8 | - | - | - | - | - |
| 18 | 3281 | - | - | C5 | 1-7 | 8 | - | A | A | C |
| 19 | 3474 | - | m | - | 1-8 | - | - | - | - | - |
| 20 | 3667 | 1 | - | - | 1-8 | - | - | - | - | - |
| 21 | 3860 | - | m | - | 1-8 | - | - | - | - | - |
| 22 | 4053 | - | - | C6 | 1-8 | - | - | - | - | - |
| 23 | 4246 | - | m | - | 1-8 | - | - | - | - | - |
| 24 | 4439 | 1 | - | - | 1-7 | 8 | - | A | B | D |

FPS : Frame Pattern Sequence (001011)

CRC : Cyclic Redundancy Check

DL : 4 kbps Data Link

CELL MULTIPLEXING DEVICE FOR SYNCHRONOUS DIGITAL INTERFACE AND METHOD THEREOF

BACKGROUND OF THE INVENTION

1. Field of the Invention

The present invention relates to a technique for mapping asynchronous fixed-length cells such as ATM cells, etc. onto an existing synchronous digital interface.

2. Description of the Related Art

Synchronous digital private lines which are conventionally connected to an enterprise have been increasingly shifted to ATM (Asynchronous Transfer Mode) lines by using TDMs (Time Division Multiplexers), etc.

In such a case, a TDM arranged in an enterprise is replaced with an ATM switch, to which a PBX (Private Branch exchange), an ATM terminal, etc. inside the enterprise are connected.

Since communications are asynchronously made and communications channels are not always busy with the ATM system, the effect of multiplexing is significant and multimedia data, etc. can be efficiently transmitted.

An ATM line has the transmission rate of at least 155 Mbps. If one certain enterprise attempts to newly adopt ATM lines instead of synchronous digital private lines in a current state, it requires a lot more cost.

Therefore, there is a conventional technique for mapping ATM cells onto a synchronous digital interface format as a technique for promoting the shift from a synchronous digital communication to an ATM communication. As typical techniques, the techniques stipulated by the ITU-T G.804, the ATM Forum AF-PHY-0016.000, the UNI version 3.1, etc. are known.

Use of such techniques allows a TDM, etc. arranged in an enterprise to be replaced with an ATM switch without changing an existing synchronous digital interface on a network side and an existing PBX and terminal equipment, etc. inside the enterprise.

More specifically, the ATM switches to which the above described techniques are applied are arranged at both ends of a private synchronous private line. By connecting existing PBXs and terminals in an enterprise to the ATM switches at the beginning of the shift, ATM cells are mapped onto a synchronous digital interface and transmitted by a communication between the ATM switches at both of the ends without user's awareness of the shift from the TDM devices, etc. to the ATM switch. At a later stage of the shift, ATM terminals, etc. are newly connected to the ATM switches, so that the user can smoothly and gradually shift the existing terminals, etc. to the ATM terminals, etc.

As a current contract form of the synchronous digital private line, not an entire bandwidth, but only a bandwidth according to an amount required by traffic can be contracted. In this case, a user will use a predetermined number of time slots among the time slots allocated to a synchronous digital private line via a TDM, etc.

With the above described conventional technique for mapping ATM cells onto a synchronous digital interface, however, the ATM cells are mapped onto an entire bandwidth (all time slots) of the physical line configuring the synchronous digital interface. Therefore, this mapping technique has the problem of being unable to be applied to the implementation in which only part of the bandwidth (some of the time slots) of the synchronous digital private line is used.

SUMMARY OF THE INVENTION

The present invention was developed in the above described background, and aims at allowing asynchronous fixed-length cells to be mapped onto part of a bandwidth of a synchronous digital private line.

The present invention assumes the cell multiplexing technique for mapping asynchronous fixed-length cells onto an existing synchronous digital interface, and is characterized in that a plurality of time slots structuring the synchronous digital interface are divided into a plurality of time slot groups, onto each of which the data streams of asynchronous fixed-length cells, which respectively belong to a plurality of communication device interfaces, are mapped.

BRIEF DESCRIPTION OF THE DRAWINGS

One skilled in the art can easily understand additional features and objects of this invention from the description of the preferred embodiments and some of the attached drawings. In the drawings.

DESCRIPTION OF THE PREFERRED EMBODIMENTS

Explanation about Principle

Provided first is the explanation about the principle of the present invention.

The present invention assumes a cell multiplexing device for mapping asynchronous fixed-length cells (ATM cells) onto an existing synchronous digital interface 101 (DS1 (Digital Signal level 1) interface) and a method thereof.

Figure 1:
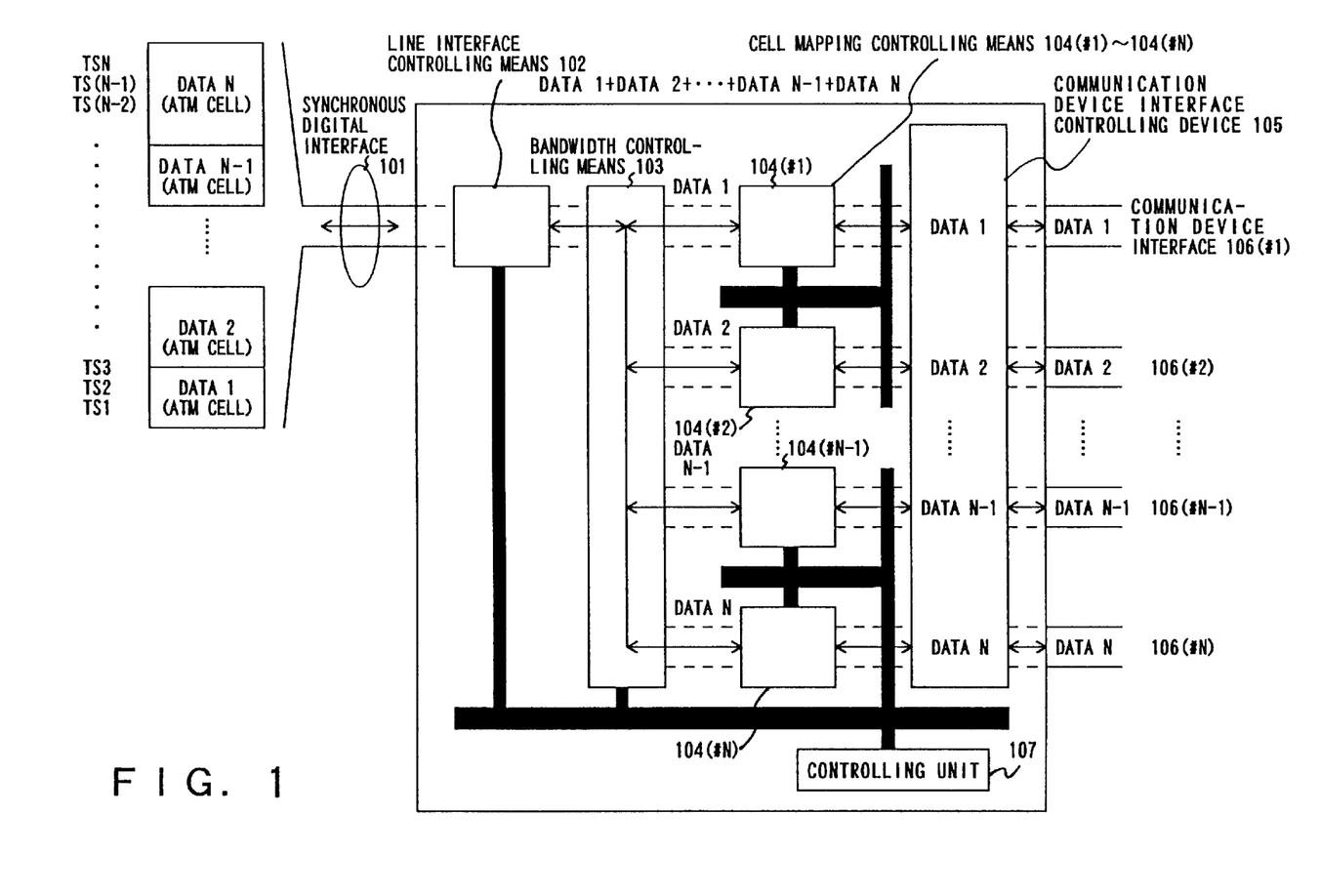
FIG. 1 is a schematic diagram showing the configuration of the present invention.

FIG. 1 is a schematic diagram showing the configuration of the first preferred embodiment according to the present invention.

A line interface controlling means 102 (line interface controlling unit 301) terminates a line of a synchronous digital interface 101.

A bandwidth controlling means 103 (bandwidth controlling unit 302) generates a timing signal for specifying respective timing of a plurality (#1 through #N) of time slot groups in order to divide a plurality of time slots structuring the synchronous digital interface 101 into the plurality of time slot groups. The specification for dividing time slots into time slot groups is made, for example, from a controlling unit 107.

A plurality (#1 through #N) of cell mapping controlling means 104 (ATM cell mapping controlling units 303) identify each of the plurality of time slot groups in the synchronous digital interface 101 based on the above described timing signal, and respectively maps the data streams of asynchronous fixed-length cells, which respectively belong to the plurality of communication device interfaces 106 (switch interfaces), onto each of the identified time slot groups, for example, via the communication device interface controlling device 105 (switch interface controlling unit 304).

With the above described configuration of the first preferred embodiment according to the present invention, it becomes possible to map asynchronous fixed-length cells processed by an arbitrary communication device interface 106 onto an arbitrary time slot group in a synchronous digital interface.

The second preferred embodiment according to the preset invention has the following configuration.

A plurality of line interface controlling means 102 terminate the plurality of synchronous digital interface lines.

A bandwidth controlling means 103 generates a timing signal for specifying the respective timing of a plurality of time slot groups in order to divide a plurality of time slots structuring a synchronous digital interface into the plurality of time slot groups in each synchronous digital interface.

The plurality of cell mapping controlling means 104 respectively identify a single predetermined time slot group among a plurality of time slot groups in a single predetermined synchronous digital interface among a plurality of synchronous digital interfaces based on the timing signal, and maps the data stream of asynchronous fixed-length cells belonging to a single predetermined communication device interface among a plurality of communication device interfaces onto the identified predetermined time slot group.

With the above described second preferred embodiment according to the present invention, how to use a plurality of synchronous digital interfaces, and how to map asynchronous fixed-length cells corresponding to each communication device interface to each synchronous digital interface can be arbitrarily changed.

As described above, according to the present invention, a user can smoothly and gradually shift from an existing terminal, etc. to an ATM terminal, etc. with a high degree of flexibility.

Detailed Description for the Preferred Embodiments

Provided next are the details of the respective preferred embodiments according to the present invention, by referring to the drawings.

<Assumed Network System>

Figure 2:
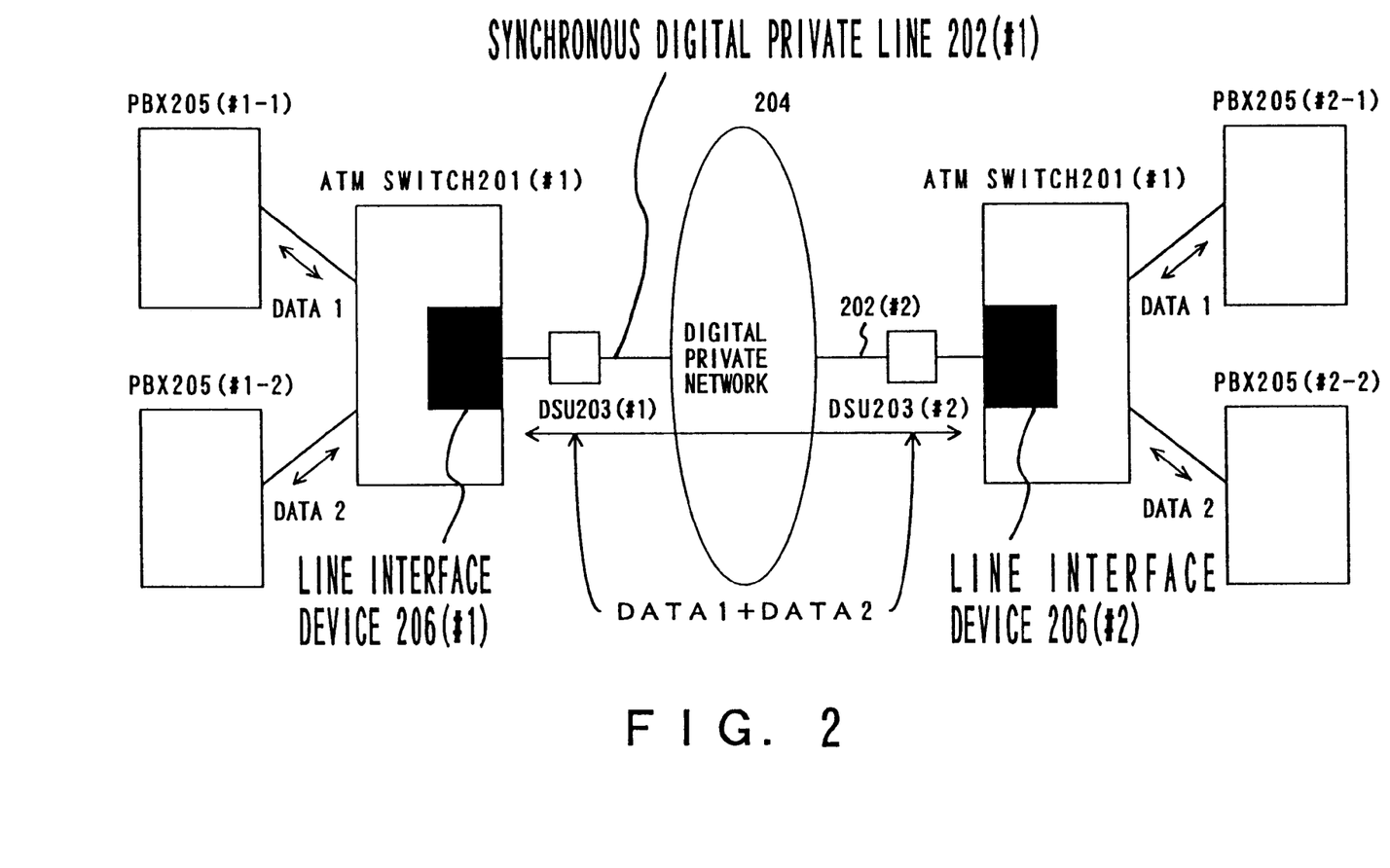
FIG. 2 is a schematic diagram showing a network system assumed by each of the preferred embodiments according to the present invention.

FIG. 2 is a schematic diagram showing the configuration of a network system assumed by the preferred embodiments according to the present invention. Synchronous digital private lines 202 #1 and #2 accommodated by a digital dedicated line network 204 are respectively connected to ATM switches 201 #1 and #2 via respective DSUs (Digital Service Unit) 203 #1 and #2 and line interface devices 206 #1 and #2. The ATM switch 201 #1 is connected with PBXs 205 #1-1 and #1-2, while the ATM switch 201 #2 is connected with PBXs 205 #2-1 and #2-2.

<First Preferred Embodiment>

Figure 3:
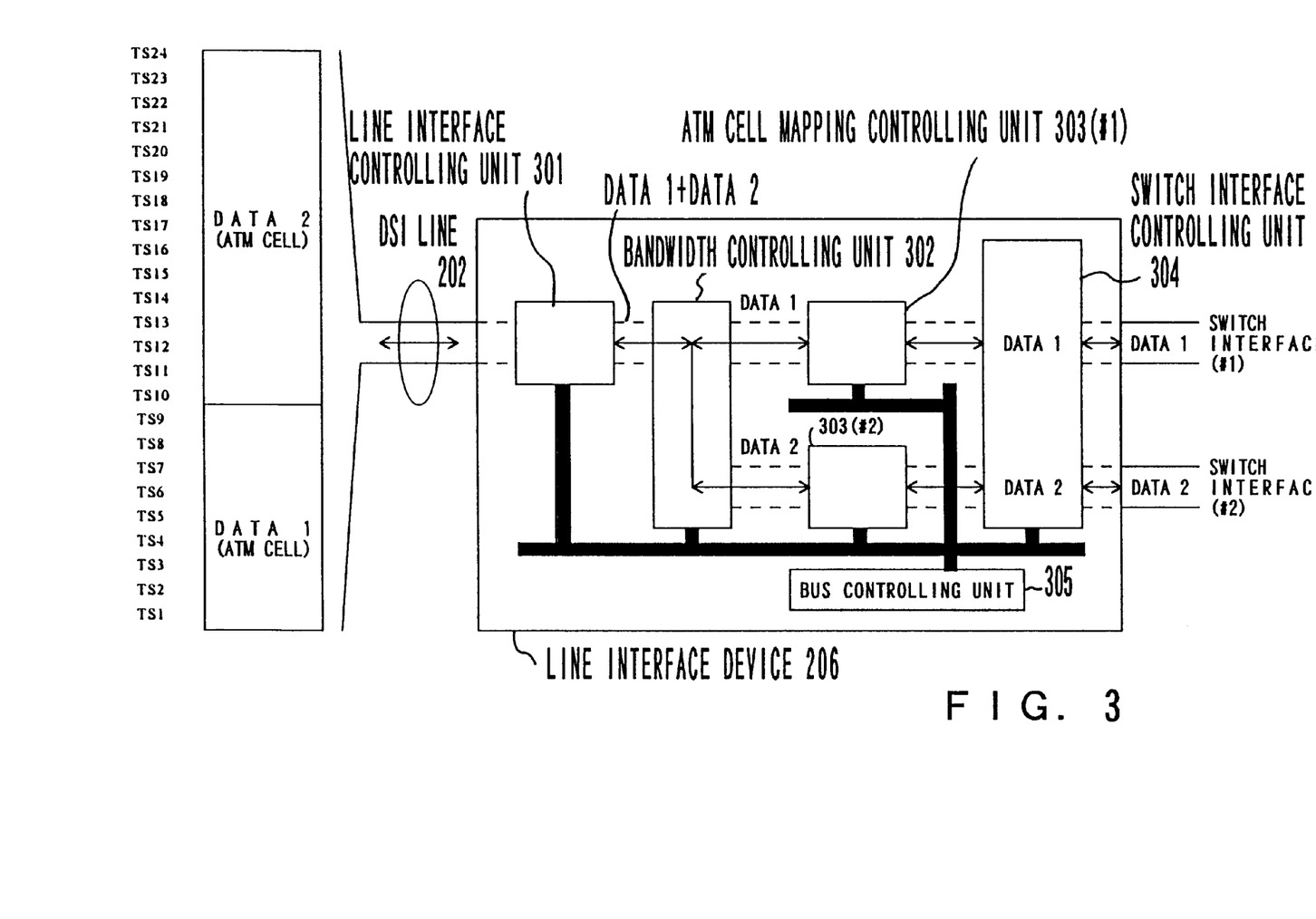
FIG. 3 is a schematic diagram showing the configuration of a first preferred embodiment according to the present invention.

FIG. 3 is a schematic diagram showing the configuration of a line interface device 206, which is arranged in the ATM switch 201 shown in FIG. 2 and terminates a DS1 line 202 that is the synchronous digital private line 202, according to the first preferred embodiment of the present invention.

The DS1 line 202 that is the synchronous digital private line 202 shown in FIG. 2 has a bandwidth (transmission rate) of 1.5 Mbps (64 Kbps per time slot×24 time slots). In the first preferred embodiment according to the present invention, this bandwidth is divided into, for example, a bandwidth #1 of 640 Kbps (64 kbps per time slot×10 time slots (time slots TS1 through TS10)) and a bandwidth #2 of 896 Kbps (64 Kbps per time slot×14 time slots (time slots TS11 through TS24). Data 1 mapped onto the bandwidth #1 as ATM cells is processed by a switch interface device (#1) in the ATM switch 201, which is not shown in FIG. 2, and is connected with the first PBX 205 (corresponding to the PBX 205 #1-1 or #2-1 of FIG. 2), etc. Data 2 mapped onto the bandwidth #2 as ATM cells is processed by a switch interface device (#2) in the AtM switch 201, which is not shown in the drawings, and is connected with the second PBX 205 (corresponding to the PBX 205 #1-2 or #2-2 of FIG. 2).

FIGS. 4A and 4B show the data format of the DS1 line 202 shown in FIG. 3.

Figure 4:
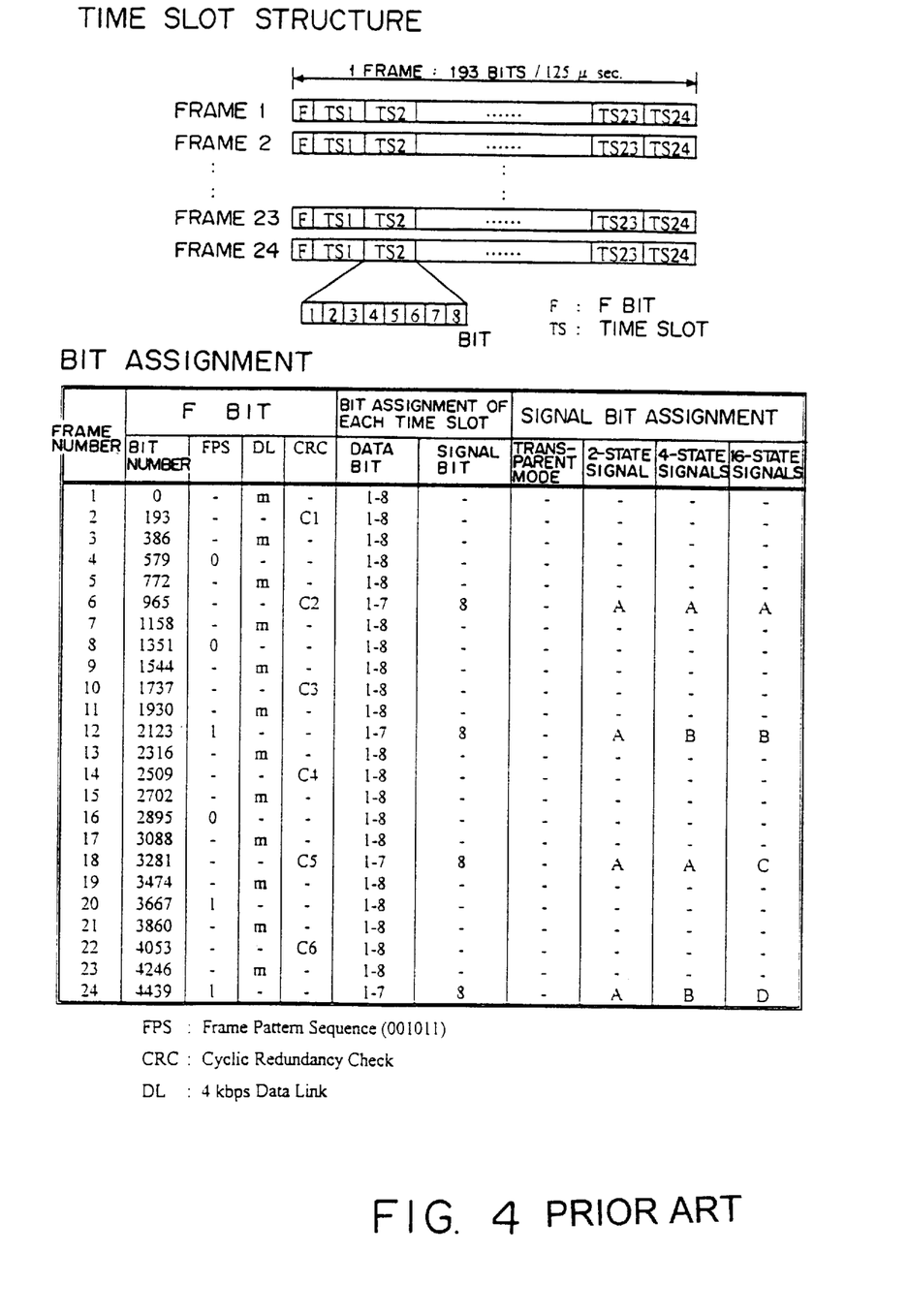
FIGS. 4A and 4B show the data format of a DS1 line.

As shown in FIG. 4($a$), the DS1 line 202 has a multiframe structure composed of frames 1 through 24. Each of the frames is composed of an F bit of one bit length, and 24 time slots TS1 through TS24, which are respectively 8-bit length. Each of the frames transmits 193-bit data in 125 $\mu$sec (microseconds) cycles. Accordingly, each time slot channel has the transmission rate of 64 Kbps.

Furthermore, as shown in FIG. 4$b$, a frame pattern sequence "001011" is transmitted by using each F bit of the frames 4, 8, 12, 16, 20, and 24. Each transmission device including the ATM switch 201 establishes frame synchronization and multiframe synchronization by detecting this frame pattern sequence.

Similarly, as shown in FIG. 4($b$), a control data link "DL" having the transmission rate of 4 Kbps is established by using each F bit (represented as "m" in this figure) of the odd-numbered frames. This control data link "DL" is mainly used for transferring maintenance data.

Similarly, as shown in FIG. 4($b$), CRC (Cyclic Redundancy Check) codes C1 C2, C3, C4, C5, and C6 are transmitted by using each F bit of the frames 2, 6, 10, 14, 18, and 22. A transmission error is checked by using these CRC codes.

Similarly, as shown in FIG. 4($b$), the 8 bits of each of the time slots TS1 through TS24 in the frames other than the frames 6, 12, 18, and 24 are assigned as the bits for transferring user data.

The bits 1 through 7 among the 8 bits of each of the time slots TS1 through TS24 in the frames 6, 12, 18, and 24 are assigned as the bits for transferring user data, and the bit 8 (lowest bit) is used for transmitting a 2-state signal A, 4-state signals A and B, and 16-state signals A, B, C, and D, which are control data. However, because ATM cells are sequentially mapped onto one or more successive time slots according to the preferred embodiments of the present invention, the above described state signals are not used and a transparent mode is set up instead.

Figure 5:
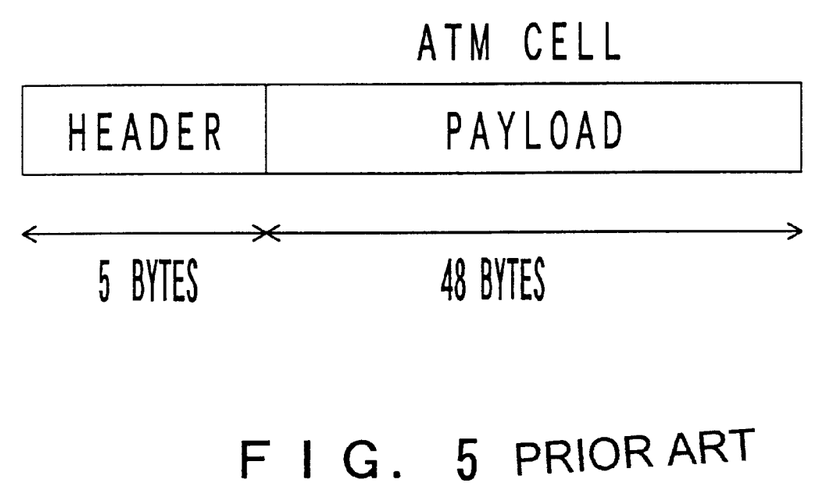
FIG. 5 shows the data format of an ATM cell.

Turning back to the explanation of FIG. 3. When data is transmitted to the DS1 line 202, each switch interface device in the ATM switch 201 of FIG. 2, which is not shown in FIG. 2, generates the ATM cell having the data format shown in FIG. 5 from the synchronous digital signal received from an existing PBX 205, for example, if the switch interface device terminates the existing PBX 205. The switch interface device then transfers the generated ATM cell to a switch circuit in the ATM switch 201, which is not shown in FIG. 2. Or, each switch interface device transfers the ATM cell which has the data format shown in FIG. 5 and is received from an ATM terminal, for example, if the switch interface device terminates the ATM terminal.

Figure 6:
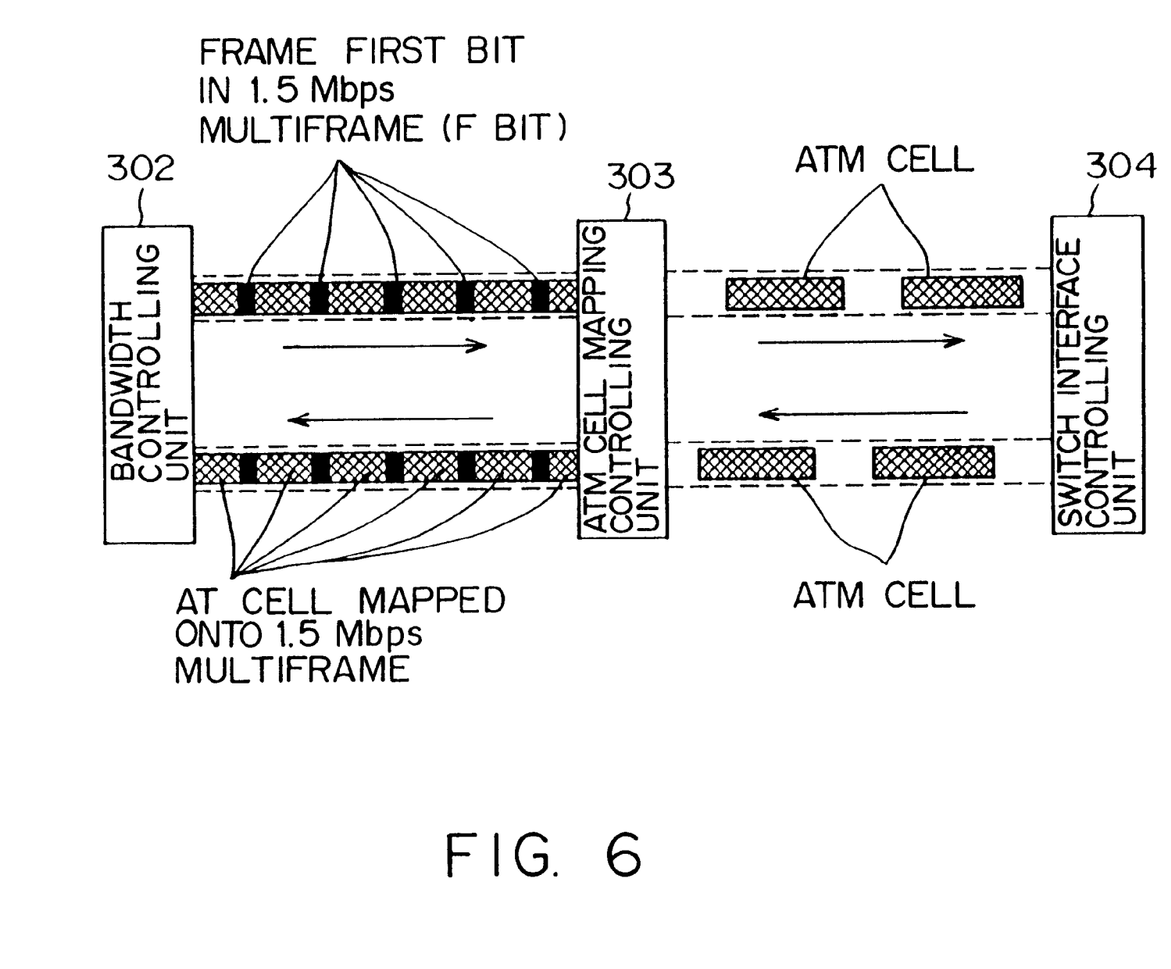
FIG. 6 is a schematic diagram explaining cell mapping (No.1)

As shown in FIG. 6, the switch interface controlling unit 304 of FIG. 3, which configures the line interface device 206 in the ATM switch 201, transfers to an ATM cell mapping controlling unit 303 #1 the ATM cell received from each switch interface device (#1) in the ATM switch 201, which is not shown in the drawings, via the switch circuit in the ATM switch 201, which is not shown in FIG. 2. The switch interface controlling unit 304 then transfers the ATM cell received from the switch interface device (#2) not shown in FIG. 2 via the switch circuit not shown in FIG. 2 to an ATM cell mapping controlling unit 303 #2.

Figure 9:
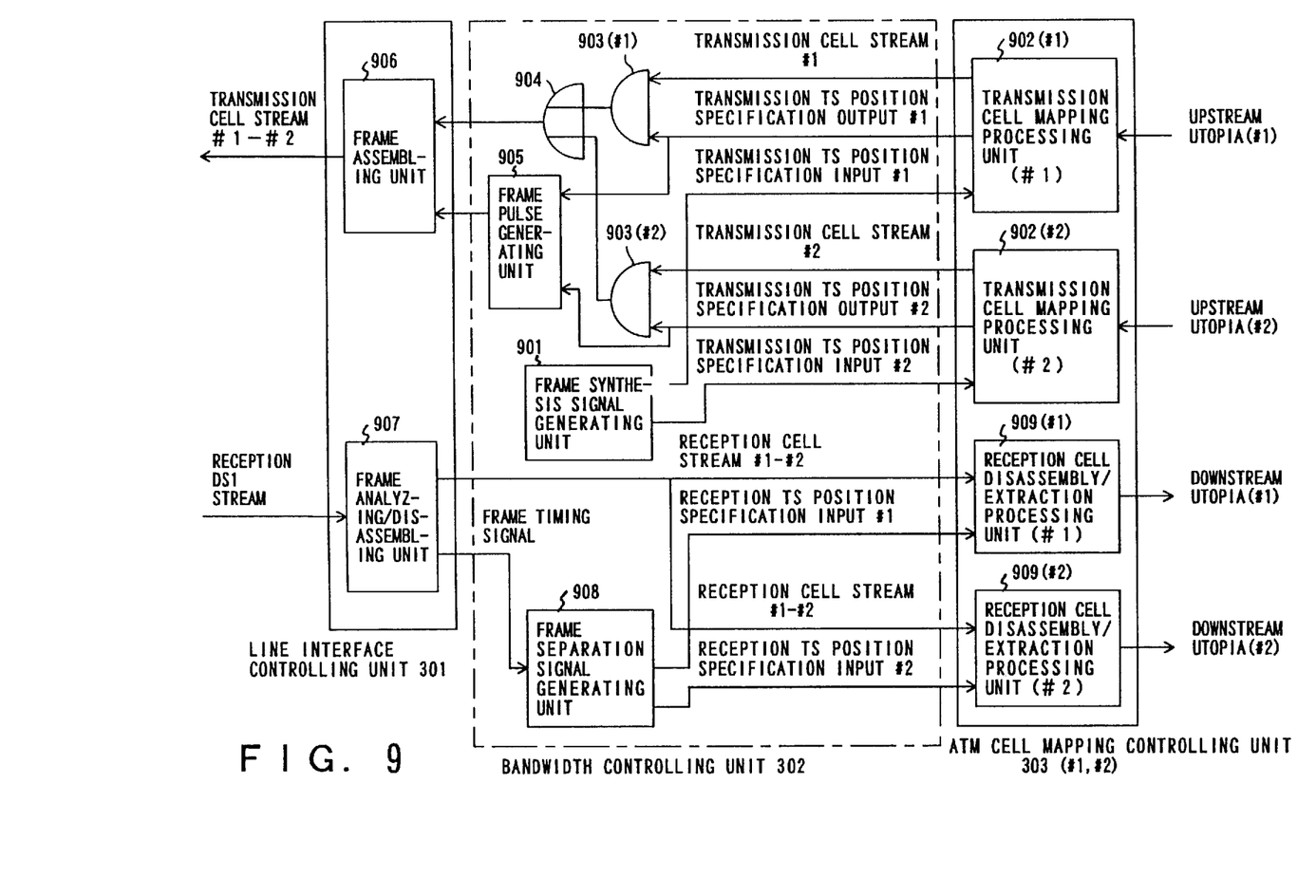
FIG. 9 is a block diagram showing the details of the configuration according to the first preferred embodiment of the present invention.

A bandwidth controlling unit 302 provides to the ATM cell mapping controlling unit 303 #1 the transmission timing data (a transmission TS position specification input #1 which is shown in FIG. 9 and will be described later) for specifying the bandwidth #1 (TS1 through TS10) instructed by the bus controlling unit 305, and provides to the ATM cell mapping controlling unit 303 #2 the transmission timing data #2 (a transmission TS position specification input #2 which is shown in FIG. 9 and will be described later) for specifying the bandwidth #2 (TS11 through TS24) instructed by the bus controlling unit 305.

The ATM cell mapping controlling unit 303 #1 maps the ATM cell received from the switch interface controlling unit 304 onto a data 1 stream in the bandwidth #1 (TS1 through TS10), which is specified by the transmission timing data #1, in synchronization with this data #1 provided from the bandwidth controlling unit 302, and outputs the mapped data 1 stream to the bandwidth controlling unit 302. Similarly, the ATM cell mapping controlling unit 303 #2 maps the ATM cell received from the switch interface controlling unit 304 onto a data 2 stream in the bandwidth #2 (TS11 through TS24), which is specified by the transmission timing data #2, in synchronization with this data #2 provided from the bandwidth controlling unit 302, and outputs the mapped data 2 stream to the bandwidth controlling unit 302.

Figure 7:
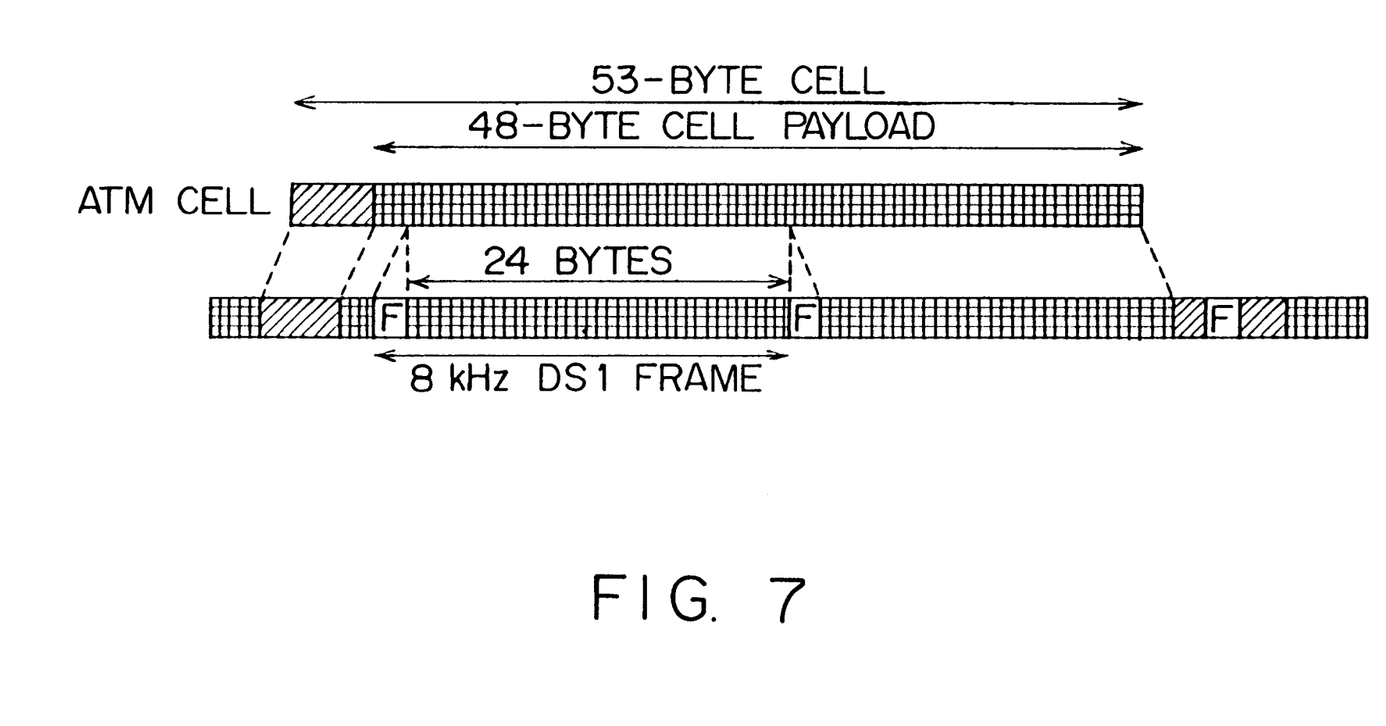
FIG. 7 is a diagram explaining cell mapping (No.2)
Figure 8:
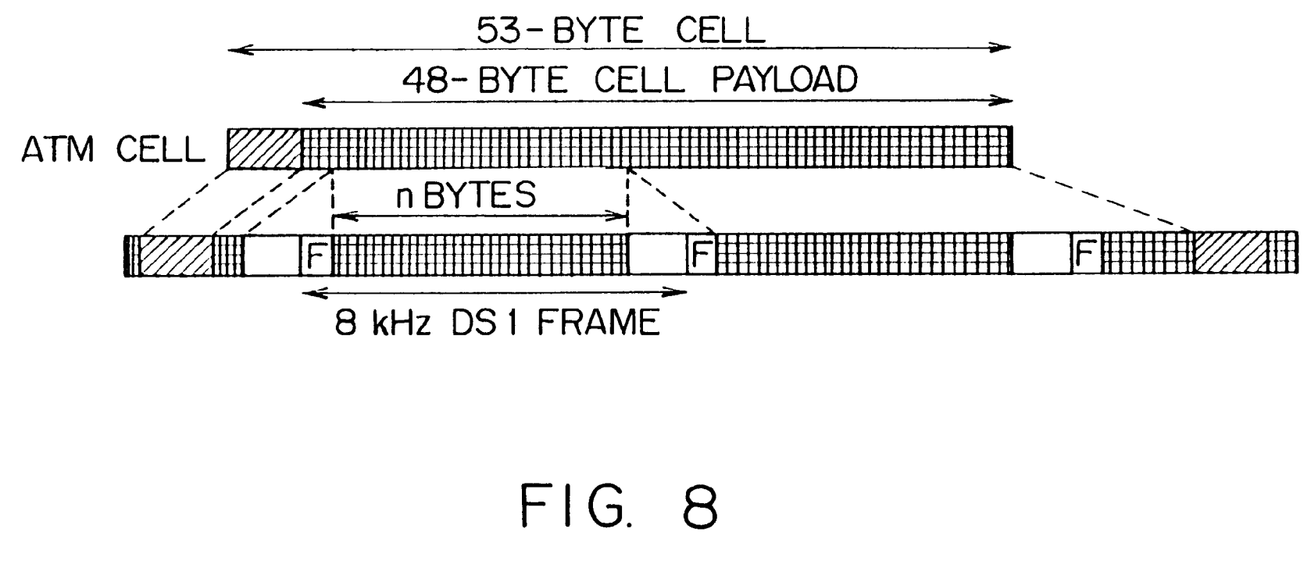
FIG. 8 is a diagram explaining cell mapping (No.3)

ATM cells are mapped onto each of the data streams as shown in FIG. 6. More specifically, if one ATM cell mapping controlling unit 303 maps the respective ATM cells onto all the time slots TS1 through TS24, the respective ATM cells are mapped onto the time slots TS1 through TS24 of each of the frames as shown in FIG. 7. Or, if one ATM cell mapping controlling unit 303 maps the respective ATM cells onto the time slots TS1 through TSn (n=10 in this preferred embodiment), they are mapped onto the time slots TS1 through TSn of each of the frames as shown in FIG. 8.

The bandwidth controlling unit 302 generates the data stream of each of the frames composed of the time slots TS1 through TS24 by synthesizing the data 1 stream received from the ATM cell mapping controlling unit 303 #1 and the data 2 stream received from the ATM cell mapping controlling unit 303 #2, and transfers the synthesized stream to the line interface controlling unit 301. Additionally, the bandwidth controlling unit 302 generates the frame pulse indicating the beginning of each of the frames, and provides the generated frame pulse to the line interface controlling unit 301.

The line interface controlling unit 301 maps the data stream of each of the frames composed of the time slots TS1 through TS24, which is received from the bandwidth controlling unit 302, onto the frame format (shown in FIG. 4) of the DS1 line 202 in synchronization with the frame pulse provided from the bandwidth controlling unit 302, and transmits the mapped stream to the DS1 line 202.

If the data is received from the DS1 line 202, the line interface controlling unit 301 first extracts the data stream of each of the frames of the DS1 line 202, and transmits the extracted stream to the bandwidth controlling unit 302. Additionally, the line interface controlling unit 301 extracts the frame timing by taking out the F bit from each of the frames of the DS1 line 202, and provides the frame timing signal indicating the extracted frame timing to the bandwidth controlling unit 302.

As shown in FIG. 6, the bandwidth controlling unit 302 transfers the data stream of each of the frames received from the line interface controlling unit 301 to the ATM cell mapping controlling units 303 #1 and #2; provides to the ATM cell mapping controlling unit 303 #1 the reception timing data #1 (a reception TS position specification input #1 which is shown in FIG. 9 and will be described later) for specifying the bandwidth #1 (TS1 through TS10) instructed by the bus controlling unit 305; and provides to the ATM cell mapping controlling unit 303 #2 the reception timing data #2 (a reception TS position specification input #2 which is shown in FIG. 9 and will be described later) for specifying the bandwidth #2 (TS11 through TS24) instructed by the bus controlling unit 305, in synchronization with the frame timing signal provided from the line interface controlling unit 301.

The ATM cell mapping controlling unit 303 #1 extracts the data 1 in the bandwidth #1 (TS1 through TS10) from the received data stream in synchronization with the reception timing data #1 provided from the bandwidth controlling unit 302; sequentially extracts the ATM cells from the data 1 as shown in FIG. 6; and transfers the extracted ATM cells to the switch interface controlling unit 304. Similarly, the ATM cell mapping controlling unit 303 #2 extracts the data 2 in the bandwidth #2 (TS11 through TS24) from the received data stream in synchronization with the reception timing data #2 provided from the bandwidth controlling unit 302; sequentially extracts the ATM cells from the data 2 as shown in FIG. 6; and transfers the extracted cells to the switch interface controlling unit 304.

The switch interface controlling unit 304 transmits the ATM cells received from the ATM cell mapping controlling unit 303 #1 to the switch circuit in the ATM switch 201, which is not shown in the drawings. As a result, the ATM cells are transferred to a suitable switch interface device (#1) which is not shown in FIG. 2 and which terminates the PBX 205 of FIG. 2, etc. via the switch circuit. Similarly, the switch interface controlling unit 304 transmits the ATM cells received from the ATM cell mapping controlling unit 303 #2 to the switch circuit in the ATM switch 201, which is not shown in FIG. 2. Consequently, the ATM cells are transferred to a suitable switch interface device (#2) which is not shown in FIG. 2 and which terminates the PBX 205 of FIG. 2, etc. via the switch circuit.

For example, if each of the switch interface devices terminates an existing PBX 205, it extracts the synchronous digital signal from the received ATM cells and transfers the extracted signal to the PBX 205. Or, for example, if each of the switch interface devices terminates an ATM terminal, it transfers the received ATM cells to the ATM terminal.

With the above described basic configuration of the first preferred embodiment according to the present invention, ATM cells to be processed by an arbitrary switch interface device can be mapped onto an arbitrary time slot in the DS1 line 202.

Figure 10:
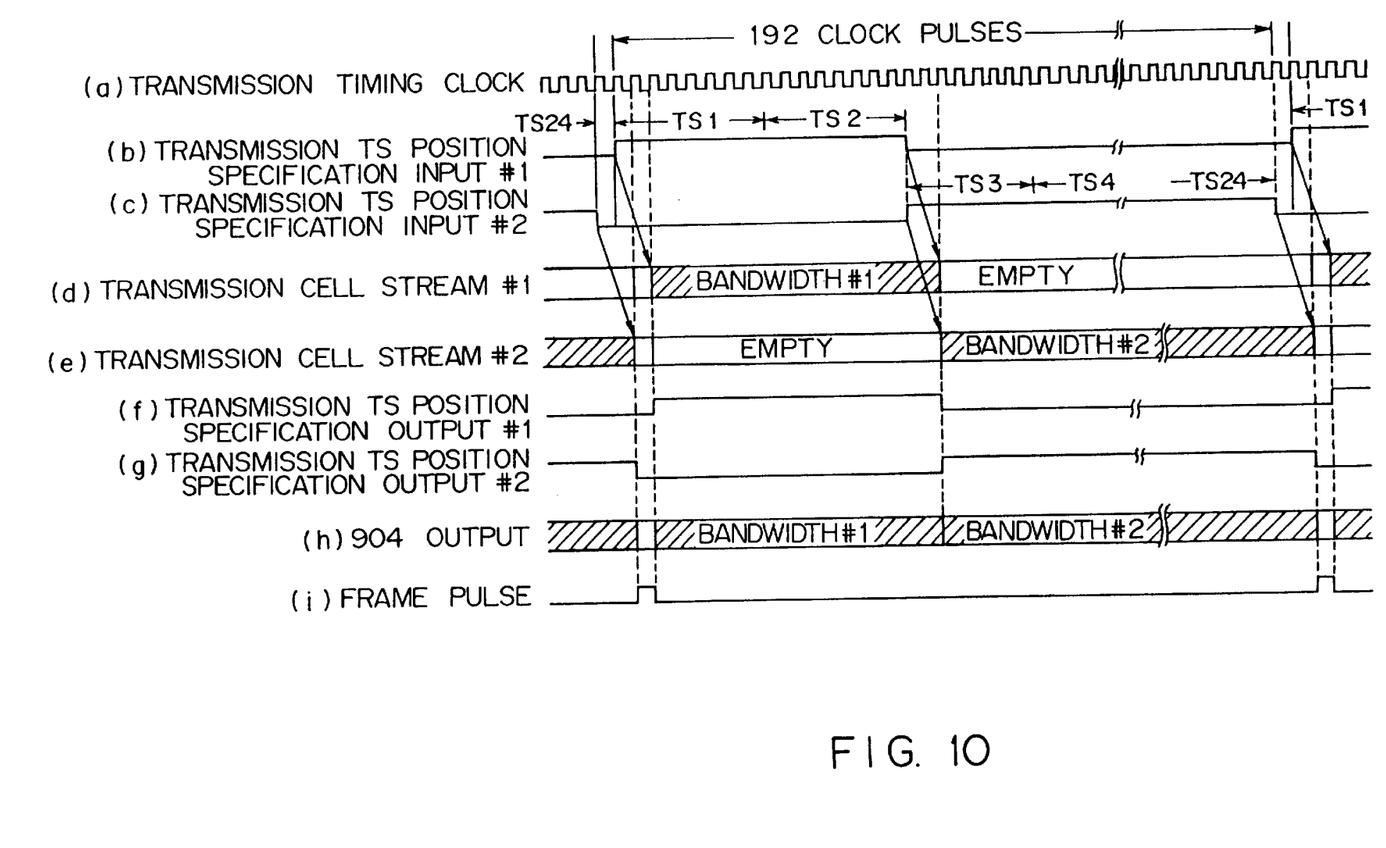
FIG. 10 is a timing chart at the time of a transmission operation performed in the configuration according to the first preferred embodiment of the present invention, whose details are illustrated in FIG. 9.
Figure 11:
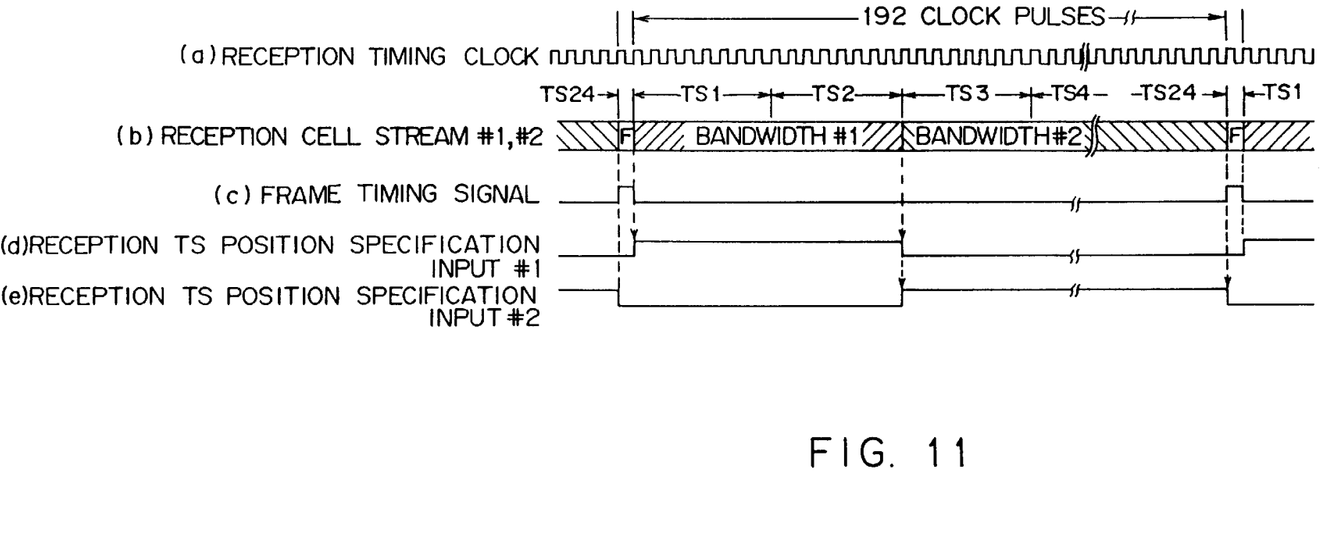
FIG. 11 is a timing chart at the time of a reception operation performed in the configuration according to the first preferred embodiment of the present invention, whose details are illustrated in FIG. 9.

FIG. 9 is a block diagram showing the details of the configuration of the line interface device 206 shown in FIG. 3 according to the first preferred embodiment of the present invention. FIG. 10 is a timing chart when this line interface device 206 performs a transmission operation, while FIG. 11 is a timing chart when the line interface device 206 performs a reception operation.

Note that FIG. 3 was explained by using the case where the bandwidth of the DS1 line 202 is divided in such a way that the bandwidth #1 corresponds to the time slots TS1 through TS10, and the bandwidth #2 corresponds to the time slots TS11 through TS24. However, FIG. 9 will be explained by using the case where the bandwidth of the DS1 line 202 is divided in such a way that the bandwidth #1 corresponds to the time slots TS1 and TS2, while the bandwidth #2 corresponds to the time slots TS3 through TS24.

Provided first is the explanation about the details of the operations performed when data is transmitted to the DS1 line 202, by referring to FIGS. 9 and 10.

A frame synthesis signal generating unit 901 in the bandwidth controlling unit 302 provides the transmission TS position specification input #1 (shown in FIG. 10(b)) for specifying the bandwidth #1 (TS1 and TS2) instructed by the bus controlling unit 305 of FIG. 3 to the transmission cell mapping processing unit 902 #1 structuring the ATM cell mapping controlling unit 303 #1 of FIG. 3; and provides the transmission TS position specification input #2 (shown in FIG. 10(c)) for specifying the bandwidth #2 (TS3 through TS24) instructed by the bus controlling unit 305 of FIG. 3 to a transmission cell mapping processing unit 902 #2 structuring the ATM cell mapping controlling unit 303 of FIG. 3.

The transmission TS position specification input #1 is at the high level during a timing period of the time slots TS1 and TS2, which synchronizes the transmission timing clock (a bit clock shown in FIG. 10(a)) provided from a device, which is not shown in FIG. 2, in the ATM switch 201 of FIG. 2, and is at the low level during other timing periods. The transmission TS position specification input #2 is at the high level during a timing period of the time slots TS3 through TS24, which synchronizes the transmission timing clock, and is at the low level during other timing periods.

The transmission cell mapping processing unit 902 #1 structuring the ATM cell mapping controlling unit 303 #1 shown in FIG. 3 maps the ATM cells received from the switch interface controlling unit 304 of FIG. 3 via an upstream UTOPIA (University of Tsukuba Online Processing of Information) interface #1 onto a transmission cell stream #1, and outputs the transmission cell stream #1 (shown in FIG. 10(d)) to the band controlling unit 302, during the 2-time-slots period (corresponding to the period during which the transmission TS position specification input #1 is at the high level) beginning from the timing which is delayed by 2 cycles of the transmission timing clock (shown in FIG. 10(a)) from the timing at which the transmission TS position specification input #1 (shown in FIG. 10(b)) comes to be at the high level. At the same time, the transmission cell mapping processing unit 902 #1 outputs the signal obtained by delaying the transmission TS position specification input #1 (shown in FIG. 10(b)) by 2 clocks to the bandwidth controlling unit 302 as a transmission TS position specification output #1 (shown in FIG. 10(f)).

Similarly, the transmission cell mapping processing unit 902 #2 structuring the ATM cell mapping controlling unit 303 #2 of FIG. 3 maps the ATM cells received from the switch interface controlling unit 304 of FIG. 3 via an upstream UTOPIA interface #2 onto a transmission cell stream #2, and outputs the transmission cell stream #2 (shown in FIG. 10(e)) to the bandwidth controlling unit 302, during the 22-time-slots period (corresponding to the period during which the transmission TS position specification input #2 is at the high level) beginning from the timing which is delayed by 2 cycles of the transmission timing clock (shown in FIG. 10(a)) from the timing at which the transmission TS position specification input #2 (shown in FIG. 10(c)) comes to be at the high level. At the same time, the transmission cell mapping processing unit 902 #2 outputs the signal obtained by delaying the transmission TS position specification input #2 (shown in FIG. 10(c)) by two clocks of the transmission timing clock (shown in FIG. 10(a)) to the bandwidth controlling unit 302 as a transmission TS position specification output #2 (shown in FIG. 10(g)).

In the bandwidth controlling unit 302, a gate circuit 903 #1 passes the transmission cell stream #1 (shown in FIG. 10(d)) only in a period during which the transmission TS position specification output #1 (shown in FIG. 10(f)) is at the high level. Similarly, a gate circuit 903 #2 passes the transmission cell stream #2 (shown in FIG. 10(e)) only in a period during which the transmission TS position specification output #2 (shown in FIG. 10(g)) is at the high level. The outputs of the gate circuits 903 #1 and #2 are synthesized by a synthesizing circuit 904, and output to a frame assembling unit 906 in the line interface controlling unit 301.

A frame pulse generating unit 905 in the bandwidth controlling unit 302 generates a frame pulse (shown in FIG. 10(i)) which is at the high level at timing when both the transmission TS position specification outputs #1 and #2 (shown in FIGS. 10(f) and 10(g)) are at the low level, and provides the generated frame pulse to the frame assembling unit 906 in the line interface controlling unit 301.

The frame assembling unit 906 in the line interface controlling unit 301 maps the transmission cell stream (#1+#2) (shown in FIG. 10(h)) of each of the frames composed of the time slots TS1 through TS24, which is received from the synthesizing circuit 904 onto the frame format (shown in FIG. 4) of the DS1 line 202 in synchronization with the frame pulse (shown in FIG. 10(i)) provided from the frame pulse generating unit 905; and transmits the mapped stream to the DS1 line 202.

If data is received from the DS1 line 202, a frame analyzing/disassembling unit 907 in the line interface controlling unit 301 first extracts a reception cell stream (#1+#2) (shown in FIG. 11(b)) from the reception DS1 stream which is the data stream of each of the frames of the DS1 line 202 in synchronization with a reception timing clock (a bit clock shown in FIG. 11(a)) extracted by the frame analyzing/disassembling unit 907 itself; and transfers the extracted stream to reception cell disassembly/extraction processing units 909 #1 and #2 which respectively structure the ATM cell mapping controlling units 303 #1 and #2 via the bandwidth controlling unit 302.

Furthermore, the frame analyzing/disassembling unit 907 extracts the frame timing by extracting the F bit from the reception DS1 stream, and provides the frame timing signal (shown in FIG. 11(c)) indicating the extracted frame timing to a frame separation signal generating unit 908 in the bandwidth controlling unit 302.

The frame separation signal generating unit 908 in the bandwidth controlling unit 302 provides a reception TS position specification input #1 (shown in FIG. 11(d)) for specifying the bandwidth #1 (TS1 and TS2) instructed by the bus controlling unit 305 of FIG. 3 to the reception cell disassembly/extraction processing unit 909 #1 structuring the ATM cell mapping controlling unit 303 #1; and provides a reception TS position specification input #2 (shown in FIG. 11(e)) for specifying the bandwidth #2 (TS3 through TS24) instructed by the bus controlling unit 305 to a reception cell disassembly/extraction processing unit 909 #2 structuring the ATM cell mapping controlling unit 303 #2.

The reception TS position specification input #1 is at the high level during a timing period of the time slots TS1 and TS2, which synchronizes the reception timing clock (shown in FIG. 11(a)), and is at the low level during other timing periods. The transmission TS position specification input #2 is at the high level during a timing period of the time slots TS3 through TS24, which synchronizes the reception timing clock, and is at the low level during other timing periods.

The reception cell disassembly/extraction processing unit 909 #1 extracts the reception cell stream #1 in the bandwidth #1 (TS1 and TS2) from the reception cell stream (#1+#2) in synchronization with the reception TS position specification input #1 (shown in FIG. 11(d)); sequentially extracts the ATM cells from the extracted stream; and transfers the extracted cells to the switch interface controlling unit 304 of FIG. 3 via a downstream UTOPIA interface #1.

Similarly, the reception cell disassembly/extraction processing unit 909 #2 extracts a reception cell stream #2 in the bandwidth #2 (TS3 through TS24) from the reception cell stream (#1+#2) in synchronization with the reception TS position specification input #2 (shown in FIG. 11(e)); sequentially extracts the ATM cells; and transfers the extracted cells to the switch interface controlling unit 304 of FIG. 3 via a downstream UTOPIA interface #2.

<Second Preferred Embodiment>

Figure 12A:
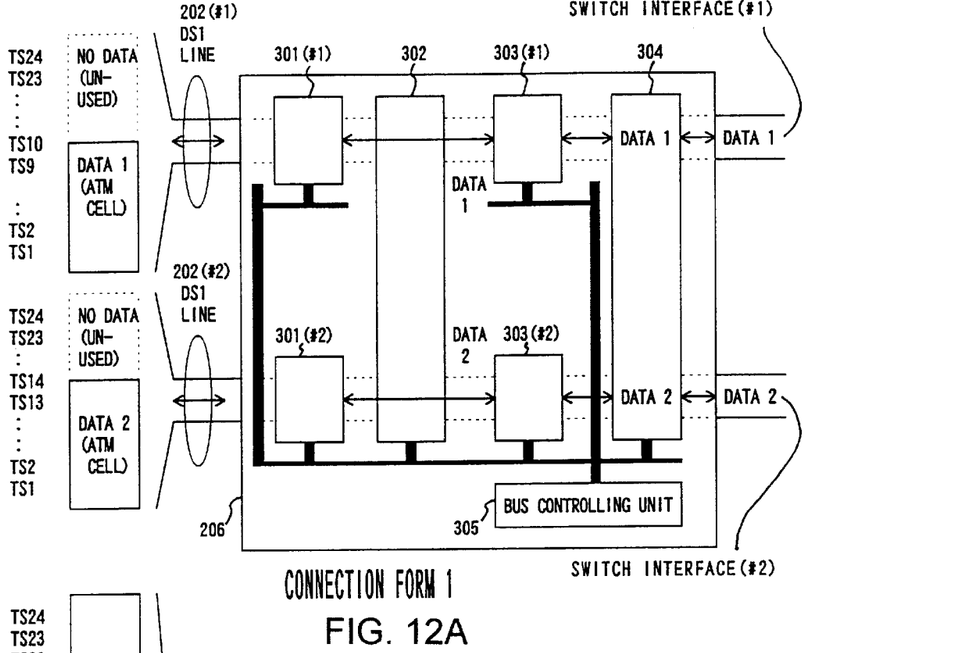
FIGS. 12(a) and 12(b) is a schematic diagrams showing the configuration of a second preferred embodiment according to the present invention.
Figure 12B:
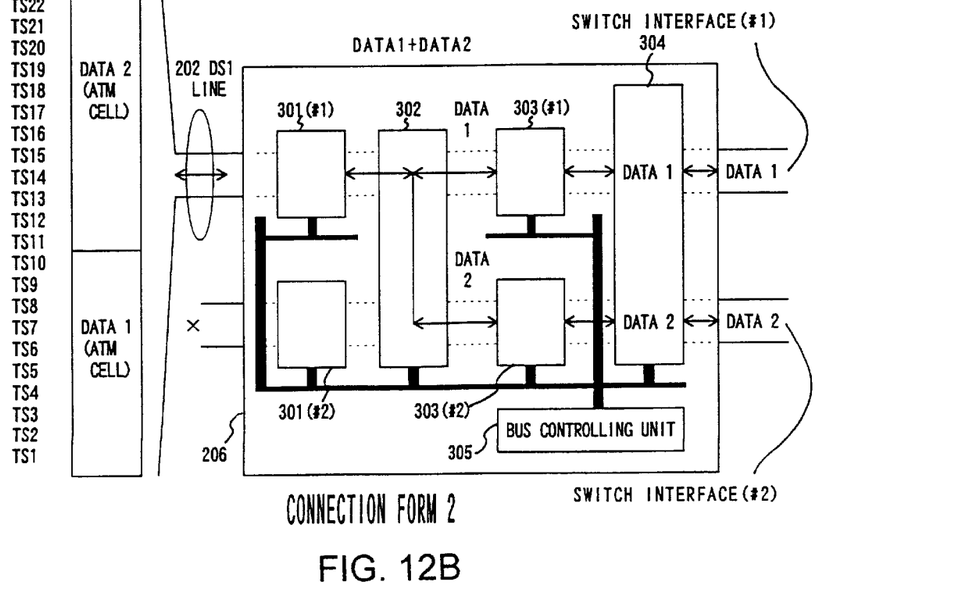

FIGS. 12(a) and 12(b) are schematic diagrams showing the configurations of the line interface device 206 which is arranged in the ATM switch 201 shown in FIG. 2 and terminates the DS1 line 202 that is the synchronous digital private line 202, according to the second preferred embodiment of the present invention.

In these figures, the portions denoted by the same reference numerals as those of FIGS. 3 and 9 have the same capabilities.

In FIGS. 12(a) and 12(b), the line interface controlling units 301 #1 and #2, which terminate the DS1 lines 202 #1 and #2, are arranged in the line interface device 206.

When a one-to-one connection capability shown in FIG. 12(a) is provided, the ATM cell mapping controlling unit 303 #1 maps ATM cells onto the bandwidth of the time slots TS1 through TS10 in the DS1 line interface 202 #1 via the line interface controlling unit 301 #1 and the bandwidth controlling unit 302, while the ATM cell mapping controlling unit 303 #2 maps ATM cells onto the bandwidth of the time slots TS1 through TS14 in the DS1 line 202 #2 via the line interface controlling unit 301 #2 and the bandwidth controlling unit 302.

When a one-to-multiple connection capability shown in FIG. 12(b) is provided, only one DS1 line 202 is arranged. Furthermore, the bus controlling unit 305 controls both the line interface controlling units 301 #1 and #2 in such a way that only the line interface controlling unit 302 #1 which terminates the DS1 line 202 performs its operations, while the line interface controlling unit 301 #2 stops its operations.

In this case, the ATM cell mapping controlling unit 303 #1 maps ATM cells onto the bandwidth of the time slots TS1 through TS10 in the single DS1 line 202 via the line interface controlling unit 301 #1 and the bandwidth controlling unit 302, while the ATM cell mapping controlling unit 303 #2 maps ATM cells onto the bandwidth of the time slots TS11 through TS24 in the single DS1 line 202 via the line interface controlling unit 301 #1 and the bandwidth controlling unit 302. This connection change is implemented by the control operation of the bandwidth controlling unit 302, which is performed by the bus controlling unit 305.

In this way, according to the second preferred embodiment of the present invention, one of the two DS1 lines 202 which is initially used is disused, and the time slots to be used can be concentrated in the other of the two. Such a use change allows the number of DSUs 203 (shown in FIG. 2) to decrease, etc.

<Other Preferred Embodiments>

In the above described second preferred embodiment, the mapping of ATM cells onto the bandwidth of predetermined time slots in one DS1 line 202 may be changed to the mapping of ATM cells onto the bandwidth of other predetermined time slots in another extra DS1 line 202.

What is claimed is:

1. A cell multiplexing method for mapping asynchronous fixed-length cells onto an existing synchronous digital interface, comprising the steps of:

terminating lines of a plurality of synchronous digital interfaces;

generating a timing signal for specifying respective timing of a plurality of time slot groups in order to divide a plurality of time slots structuring each of the plurality of synchronous digital interfaces into the plurality of time slot groups, in each of said synchronous digital interfaces;

identifying a single predetermined time slot group among the plurality of time slot groups in a single predetermined synchronous digital interface among the plurality of synchronous digital interfaces based on the timing signal, and mapping a data stream of asynchronous fixed-length cells, which belongs to a single predetermined communication device interface among a plurality of communication device interfaces, onto the identified single time slot group; and switching said single predetermined synchronous digital interface and said single predetermined time slot group to another extra synchronous digital interface and another extra time slot group.

2. The cell multiplexing method according to claim 1, wherein:

said plurality of synchronous digital interfaces are interfaces in a private network using a public line.

3. A cell multiplexing device for mapping asynchronous fixed-length cells onto an existing synchronous digital interface, comprising:

a plurality of line interface controlling means for terminating lines of a plurality of synchronous digital interfaces;

bandwidth controlling means for generating a timing signal which specifies respective timing of a plurality of time slot groups in order to divide a plurality of time slots structuring each of said plurality of synchronous digital interfaces into the plurality of time slot groups in each of said plurality of synchronous digital interfaces;

a plurality of cell mapping controlling means for respectively identifying a single predetermined time slot group among said plurality of time slot groups in a single predetermined synchronous digital interface among said plurality of synchronous digital interfaces based on the timing signal, and mapping a data stream of asynchronous fixed-length cells, which belongs to a single predetermined communication device interface among a plurality of communication device interfaces, onto the identified single time slot group; and means for switching said single predetermined synchronous digital interface and said single predetermined time slot group to another extra synchronous digital interface and another extra time slot group.

4. The cell multiplexing device according to claim 3, wherein:

said synchronous digital interface in a private network using a public line.

* * * * *